(12) United States Patent
Takahashi et al.

(10) Patent No.: US 7,923,980 B2
(45) Date of Patent: Apr. 12, 2011

(54) DIGITAL CONTROLLED POWER SUPPLY

(75) Inventors: Fumikazu Takahashi, Hitachi (JP);
Masahiro Hamaogi, Odawara (JP)

(73) Assignee: Hitachi Computer Peripherals Co., Ltd., Kanagawa-Ken (JP)

( * ) Notice: Subject to any disclaimer, the term of this patent is extended or adjusted under 35 U.S.C. 154(b) by 244 days.

(21) Appl. No.: 12/252,482

(22) Filed: Oct. 16, 2008

(65) Prior Publication Data
US 2009/0102446 A1   Apr. 23, 2009

(30) Foreign Application Priority Data

Oct. 19, 2007   (JP) ................................. 2007-271928

(51) Int. Cl.
*G05F 1/44*   (2006.01)
*G05F 1/56*   (2006.01)
(52) U.S. Cl. ......... 323/283; 323/284; 323/280; 323/281
(58) Field of Classification Search .................. 323/241, 323/244, 250, 253, 283, 284, 277, 280, 281; 363/1–9, 15, 21.01–21.18, 26, 34, 41, 47, 363/148, 159
See application file for complete search history.

(56) References Cited

U.S. PATENT DOCUMENTS
2006/0172783 A1 * 8/2006 Leung et al. .................. 455/572

FOREIGN PATENT DOCUMENTS
JP        06-319260          11/1994

OTHER PUBLICATIONS

Leonard Crane, Selecting the Best Inductor for Your DC-DC Converter, Revised Mar. 2, 2005, Coilcraft, Document 469-5, p. 4, <<http://www.inductors.ru/pdf/Doc469_selecting_inductors.pdf>>.*

* cited by examiner

*Primary Examiner* — Bao Q Vu
(74) *Attorney, Agent, or Firm* — Antonelli, Terry, Stout & Kraus, LLP.

(57) ABSTRACT

In a digital controlled power supply including a digital controller for generating a PWM signal which is used to turn on and off a switching element to obtain an output voltage for a load based on an input voltage, the digital controller includes an AD converter for receiving an analog output current from the power supply and converting the current into a digital value to produce a digital output current value, an arithmetic processing unit for conducting an arithmetic operation of a pulse width for each period of a sampling frequency of the AD converter or a frequency of carrier wave as a criterion to obtain the PWM signal, and a frequency controller for variably controlling the frequency of carrier wave and the sampling frequency on the basis of the digital output current value from the AD converter.

9 Claims, 5 Drawing Sheets

DIGITAL CONTROLLED POWER SUPPLY

BACKGROUND OF THE INVENTION

The present invention relates to a digital controlled power supply for turning a switching element on/off in response to a Pulse Width Modulation (PWM) signal to obtain an output voltage required for a load from an input voltage inputted thereto.

Due to the recent development of the semiconductor fine machining technology, there have appeared highly functional microprocessors having higher performance. Also, due to reduction in the operation voltage and the increase in the clock frequency, the current consumed in the processor and the change rate per unitary time thereof become larger. The tendency toward a lower voltage and a larger current causes a serious problem when supplying power to the processor. To cope with the problem, a Point-of-Load (POL) converter is used in ordinary cases.

The POL converter is a very small power source and is disposed at a position in the vicinity of the load to minimize line impedance between the power supply and the load of the microprocessor. To design and to install the POL converter, it is required to sufficiently give consideration to changes in various parameters caused by, for example, variations in the environmental temperature and the load. As such parameter variation, there has been well known a direct-current (DC) bias characteristic of a choke coil. This is a phenomenon in which when a direct current flows through the choke coil, inductance thereof lowers. Due to reduction in the inductance, the current further flows and an output ripple voltage becomes greater, leading to deterioration in stableness of the circuit operation and reduction in the circuit performance. It is likely in the worst situation that constituent components such as an output capacitor or condenser and IC circuits are destroyed.

To overcome such problems, there has been known a method of using a choke coil including a core made of a material having a high saturation magnetic flux density. Furthermore, there has been known a technique to improve efficiency of the power supply by reversely employing the DC bias characteristic in addition the coil superior in the DC bias characteristic (reference is to be made to, e.g., JP-A-6-319260). According to the technique, while the switching frequency is set to a low value in a low-load operation, there is utilized a coil having a particular DC bias characteristic of which inductance becomes larger in the low-load operation to suppress the output ripple voltage to a low value. This resultantly much more improves the efficiency of the power supply.

SUMMARY OF THE INVENTION

When a material having a high saturation magnetic flux density is used for the core of the choke coil, the choke coil becomes expensive and the current flows more easily. Hence, an eddy current takes place due to the alternating-current voltage additionally appearing in the coil possibly causing a considerable loss. This leads to a problem of difficulty in the designing. Furthermore, in JP-A-6-319260, although description has been given of the reduction in the switching frequency to improve the efficiency in the low-load operation, operation to be conducted when the load current is increased has not been described. In this situation, in the range of high-load operation, the inductance lowers the ripple current increases. This hence leads to a problem that the control system of the circuit becomes unstable and the circuit performance lowers.

It is therefore a preferred aim of the present invention to provide a power supply to carry out PWM control, specifically, a digital controlled power supply to conduct a control operation to possibly keep the output ripple current at a fixed value in the overall low-load operation range.

To achieve the preferred aim according to the present invention, there is provided a digital controlled power supply, having a digital controller for generating a PWM signal, the signal being used to turn on and off a switching element to obtain from an input voltage an output voltage for a load. The digital controller comprises an AD converter for receiving an analog output current from the power supply and converting the current into a digital value to thereby produce a digital output current value, arithmetic processing means for conducting an arithmetic operation of a pulse width for each period of a sampling frequency of the AD converter or a frequency of carrier wave as a criterion to obtain the PWM signal, and frequency control means for variably controlling the frequency of carrier wave and the sampling frequency on the basis of the digital output current value produced from the AD converter.

In the digital controlled power supply in one aspect of the present invention, the frequency of carrier wave and the sampling frequency synchronize with each other and respectively have periods substantially equal to each other.

In the digital controlled power supply according in other aspect of the present invention, the frequency control means multiplies the frequency of carrier wave to produce a plurality of pulses within one sampling frequency.

The digital controlled power supply in other aspect of the present invention further comprises a ripple filter circuit comprising a choke coil. The choke coil has a DC bias characteristic in which an inductance value thereof lowers as a load current increases, and a ripple variation of the output current due to the DC bias characteristic is controlled to be fixed by the frequency control means.

Furthermore in other aspect of the present invention, the digital controlled power supply has the AD converter, a subtracter, an arithmetic processing section, and frequency control means which are formed in one semiconductor circuit. The subtracter subtracts the output voltage value of the AD converter from a reference value beforehand stored in an internal memory, the arithmetic processing section for generating a compare value by using an output from the subtracter, the compare value being digitally compared with the frequency of carrier wave to obtain a PWM signal, and the frequency control means variably controls the carrier and sampling frequencies on the basis of the output current value produced from the AD converter.

To achieve the preferred aim above according to the present invention, there is provided a digital controlled power supply, having a digital controller for generating a PWM signal, the signal being used to turn on and off a switching element to obtain from an input voltage an output voltage for a load. The digital controller comprises an AD converter for receiving an analog output current and an analog output voltage from the power supply and converting the current and the voltage into digital values to thereby produce a digital output current value and a digital output voltage value, arithmetic processing means for conducting an arithmetic operation of duty of a pulse width for each period of a sampling frequency of the AD converter or a frequency of carrier wave as a criterion to obtain the PWM signal on the basis of the digital output current value and the digital output voltage value produced from the AD converter, and frequency control means for variably controlling the frequency of carrier wave and the sampling frequency on the basis of the digital output current value produced from the AD converter.

Also, to achieve the preferred aim according to the present invention, there is provided a digital controlled power supply, having a digital controller for generating a PWM signal, the signal being used to turn on and off a switching element to obtain from an input voltage an output voltage for a load. The digital controller comprises an AD converter for receiving an analog output current from the power supply and converting the current into a digital value to thereby produce a digital output current value, arithmetic processing means for conducting an arithmetic operation of a pulse width for each period of a sampling frequency of the AD converter or a frequency of carrier wave as a criterion to obtain the PWM signal, and frequency control means for variably controlling the frequency of carrier wave and a clock frequency of the arithmetic processing means on the basis of the digital output current value produced from the AD converter.

To achieve the preferred aim according to the present invention, there is provided a digital controlled power supply, having a digital controller for generating a PWM signal, the signal being used to turn on and off a switching element to obtain from an input voltage an output voltage for a load and an AD converter for receiving an analog output current from the power supply and converting the current into a digital value to thereby produce a digital output current value. The digital controller comprises arithmetic processing means and frequency control means which are formed in one semiconductor circuit, the arithmetic processing means conducts an arithmetic operation of a pulse width for each period of a sampling frequency of the AD converter or a frequency of carrier wave as a criterion to obtain the PWM signal, and frequency control means variably controls the frequency of carrier wave and the sampling frequency on the basis of the digital output current value produced from the AD converter.

In other aspects of the present invention, there is provided a digital controlled power supply conducting PWM control to keep the output ripple current at a fixed value in the overall load range with high reliability.

Other objects, features and advantages of the invention will become apparent from the following description of the embodiments of the invention taken in conjunction with the accompanying drawings.

DESCRIPTION OF THE EMBODIMENTS

Figure 1:
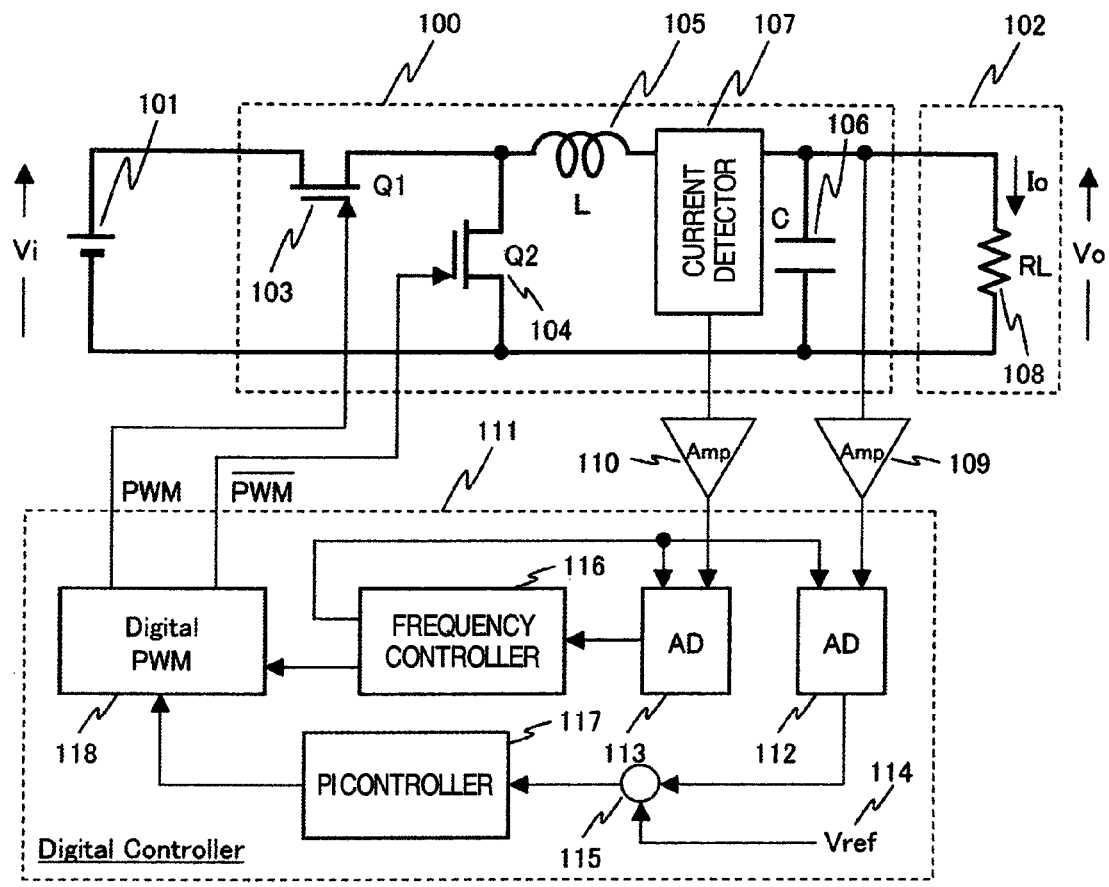
FIG. 1 is a block diagram showing a first embodiment of a digital controlled power supply.

Referring now to the drawings, description will be given of an embodiment of the present invention.

First Embodiment

FIG. 1 shows a first embodiment of the digital controlled power supply according to the present invention.

The power supply includes a power source circuit 100, a digital controller 111, and amplifiers 109 and 110. The power source circuit 100 receives an input voltage 101 as an input thereto and converts the voltage 101 into a voltage necessary for a load device 102 to output the converted voltage thereto. The circuit 100 includes a high-side Metal Oxide Semiconductor Field Effect Transistor (MOSFET) 103, a low-side MOSFET 104, a choke coil 105, a smoothing capacitor 106, and a current detector circuit 107 to obtain a current detection value of the choke coil 105. The constituent components 105 to 107 forms a smoothing circuit or a ripple filter circuit. As the current detector circuit 107, a hole device or a shunt resistor is available.

The digital controller 111 includes a voltage-conversion Analog-to-Digital (AD) converter 112 which converts an analog voltage value obtained by amplifying by the amplifier 109 an output voltage from the ripple filter circuit into a digital value including a predetermined number of bits to output the digital value therefrom, a current-conversion AD converter 113 which converts the current detection value of the choke coil 105 into a digital value including a predetermined number of bits to output the digital value therefrom, a subtracter 115 which subtracts the output value of the AD converter 112 from an output voltage reference signal 114, a Proportion and Integration (P/I) control module 117 to primarily conduct a proportional arithmetic operation and an integration for an error quantity of an output from the subtracter 115, a frequency controller 116 to variably control sampling frequencies of the AD converters 112 and 113 and a frequency of carrier wave in a digital PWM circuit 118 according to an output value from the AD converter 113, and the digital PWM circuit 118 which receives as an input thereto a result of the arithmetic operation conducted by the PI control module 117 to digitally compare the result with an internal carrier frequency to produce a PWM signal, the PWM signal being a driving signal to drive the high-side and low-side MOSFETs 103 and 104. The output voltage reference signal 114 is beforehand set to and is kept in the digital controller 111. Each of the amplifiers 109 and 110 may include a voltage divider circuit, a filter circuit, a buffer amplifier having a gain of one, or the like. Or, the amplifier may include a desired combination of these elements. To reduce the constituent components of the digital controller 111 in size and cost, it is favorable that the subtracter 115, the PI control module 117, the frequency controller 116, and the PWM circuit 118 are formed in one semiconductor integrated circuit. According to necessity, the AD converters 112 and 113 are naturally formed in the same semiconductor integrated circuit.

Figure 2:
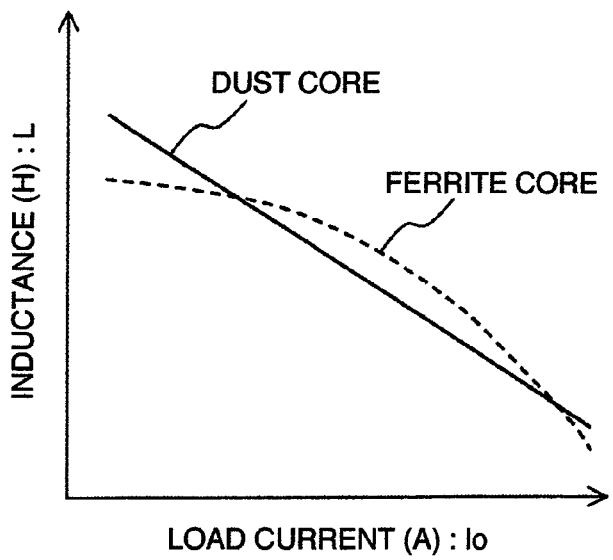
FIG. 2 is a graph showing a DC bias characteristic of a choke coil.

FIG. 2 shows a DC bias characteristic of a choke coil employed in the digital controlled power supply. This graph shows the characteristic for each of the choke coils including a dust core and a ferrite core, respectively. In either case, the value of inductance of the coil lowers according to the value of a current passing through the coil. When the dust core is employed, the reduction in inductance is larger than when the ferrite core is used. However, the choke coil including the dust core is quite inexpensive. On the other hand, by using the ferrite core, it is possible to lower the induction reduction rate with respect to the load current. However, the choke coil using the ferrite core is expensive. In the prior art, in order to secure stableness of the control system and to thereby suppress the performance deterioration, there is employed a ferrite core superior in the DC bias characteristic. However, according to the present invention, there is implemented a low-cost and high-performance power supply in which even if a core material not superior in the DC bias characteristic is used, the inferiority in the DC bias characteristic of the core material is covered by digital control.

In the embodiment, the power source circuit includes a voltage-drop converter of non-insulation type in which an output ripple current ΔIL can be represented as follows.

$$\Delta IL = (1-D)*(V_o/L)*(1/f_{sw}) \quad (1)$$

wherein Vi indicates an input voltage, Vo is an output voltage, fsw is a switching frequency, L indicates inductance, and D is an ON duty ratio of the PWM signal. In the voltage-drop converter, the following relationship holds between the input and output voltages.

$$D = V_o/V_i \quad (2)$$

As can be seen from formula (1), when the load current becomes larger and the inductance L becomes smaller due to the DC ripple characteristic, it is possible to reduce the increase in the ripple current ΔIL by increasing the switching frequency fsw. Contrarily, when the load current becomes smaller and the inductance L becomes larger, it is possible to suppress the reduction in performance in the low-load operation by lowering the switching frequency fsw. As a result, the ripple current can be kept fixed in the overall range of the load current.

Figure 3:
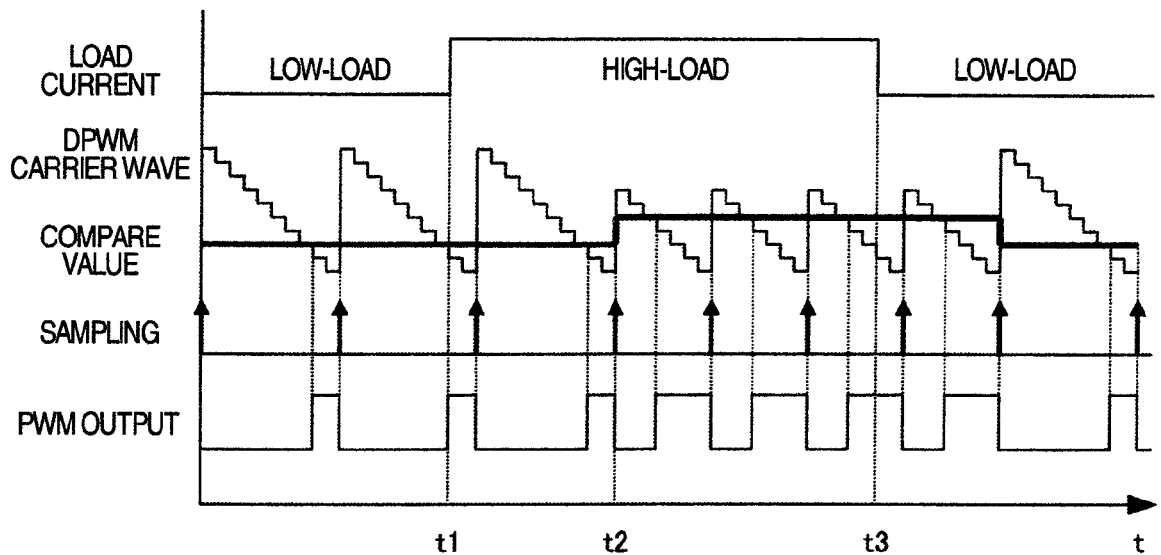
FIG. 3 is a graph to explain an operation of the first embodiment.

With reference now to FIG. 3, description will be given of operation of the embodiment. Assume that the load current Io changes from a low-load value to a high-load value at a point of time t1 and from a high-load value to a low-load value at a point of time t3. The digital PWM circuit 118 includes a timer counter to generate a discrete triangle wave (carrier wave) using the number of bits and a clock signal supplied thereto. In the example of FIG. 3, the carrier wave is generated by a down counter. For example, when the counting of 12 bits is indicated to the counter, the counter starts subtracting one from the maximum value of 4095 ($2^{12}-1$) at an interval of the clock period. When the count value reaches zero, the counter again starts subtracting one from the maximum value of 4095. In FIG. 3, the period of time from the counting start point to the counting end point is a switching period, and the compare value is an operation result outputted from the PI control module and is compared with the carrier wave in the digital PWM circuit 118. When the compare value is equal to the count value, the PWM circuit 118 outputs a high-level signal. When the count value becomes zero, the PWM circuit 118 outputs a low-level signal. The PWM signal is generated as above.

In the example of FIG. 3, the sampling period is set to a value equal to the switching period and the arithmetic operation of the compare value is completely carried out during one sampling interval. When the load changes to a high load at time t1, the system conducts an operation for an error quantity according to a change in the load during the sampling interval after t1, and hence the compare value largely varies at the sampling start point (time t2) after t1. As a result, the ON period of the PWM output is elongated to compensate for power in the high-load state.

During the sampling period after t1, current information in a high-load operation or state is obtained from the current-conversion AD converter 113. On the basis of the information, the frequency controller 116 determines whether or not the carrier and sampling frequencies are to be changed. If it is determined to increase the frequency, the controller 116 issues an indication to the digital PWM circuit 118 to reduce the number of bits to be counted by the counter and an indication to the AD converter 113 to increase the sampling frequency. After t2, the carrier and sampling frequencies are higher than before t2. That is, in the high-load state, to set the ripple current to a fixed value by suppressing an event in which the inductance of the choke coil lowers and the output ripple current increases, the control operation is conducted to heighten the switching frequency. Contrarily, when the load is changed to a low-load state at time t3, the control operation is carried out to lower the frequencies. Also in this case, the operation is basically reverse to that described above, and hence description thereof will be avoided.

Figure 4:
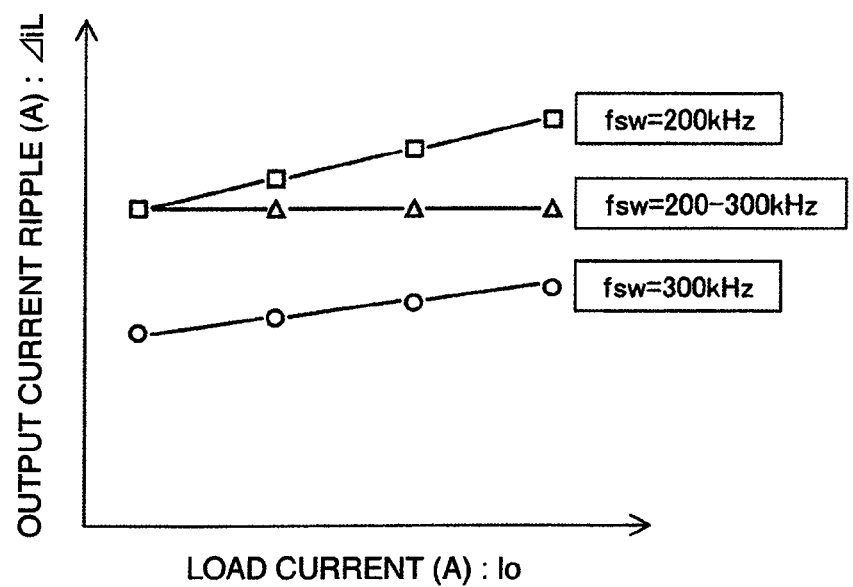
FIG. 4 is a graph showing an advantage of the first embodiment.

FIG. 4 schematically shows an advantage of the embodiment. In the graph, the abscissa represents the load current and the ordinate represents the output ripple current. FIG. 4 shows a relationship between the load current and the output ripple current when the switching frequency fsw is fixed to 200 kiloHertz (kHz) and 300 kHz and when the frequency control operation is carried out between 200 kHz and 300 kHz. When the frequency is fixed to 200 kHz, the ripple current can be reduced than when the frequency is fixed to 300 kHz. However, the switching loss becomes higher when the frequency is increased, which leads to a disadvantage of performance deterioration. In contrast thereto, when the frequency is variably controlled between 200 kHz and 300 kHz according to the load current, the ripple current can be possibly kept fixed as shown in FIG. 4. In this situation, the overall performance is improved as compared with the case in which the frequency is fixed to 300 kHz. Hence, it is possible to secure stableness of the circuit operation and to reduce the volume of the ripple filter circuit. Since an inexpensive choke coil is available, a small-sized, low-cost power supply can be implemented.

Second Embodiment

Figure 5:
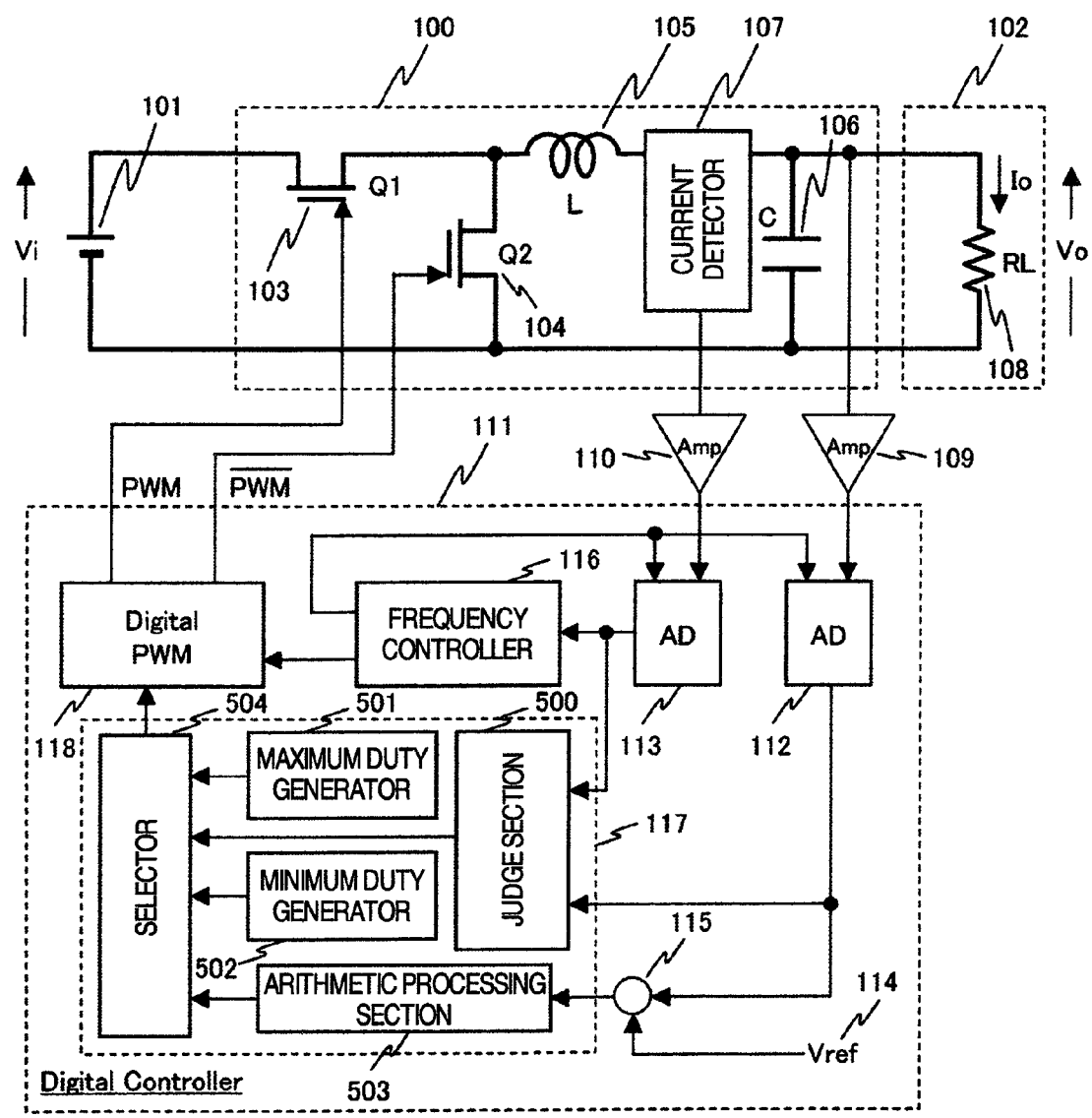
FIG. 5 is a block diagram showing a second embodiment of a digital controlled power supply.

FIG. 5 shows a second embodiment of the present invention. In conjunction with the second embodiment, the same constituent components as those of the first embodiment will not be described. FIG. 5 shows in detail the structure and operation of the PI control module 117. The module 117 includes a judge section 500, a maximum (Max.) duty generator 501, a minimum (Min.) duty generator 502, an arithmetic processing section 503, and a selector 504. The maximum duty generator 501 beforehand includes therein a compare value which is a fixed value for which the duty takes a maximum value. Contrarily, the Min duty generator 502 beforehand includes therein a compare value for which the duty takes a minimum value. That is, in the embodiment, there does not appear processing overhead due to processing in which the arithmetic processing section 503 carried out a predetermined operation for an error quantity of the output from the subtracter 115 to resultantly output the compare value. The judge section 500 receives as inputs thereto the respective output values from the voltage-conversion AD converter 112 and the current-conversion AD converter 113 and determines, on the basis of the output values, which one of the compare values including the maximum duty value, the Min. duty value, and the value obtained by the arithmetic processing section 503 to output a control signal to the selector circuit 504. In response to the control signal, the selector circuit 504 delivers either one of the compare values to the digital PWM circuit 118.

Figure 6:
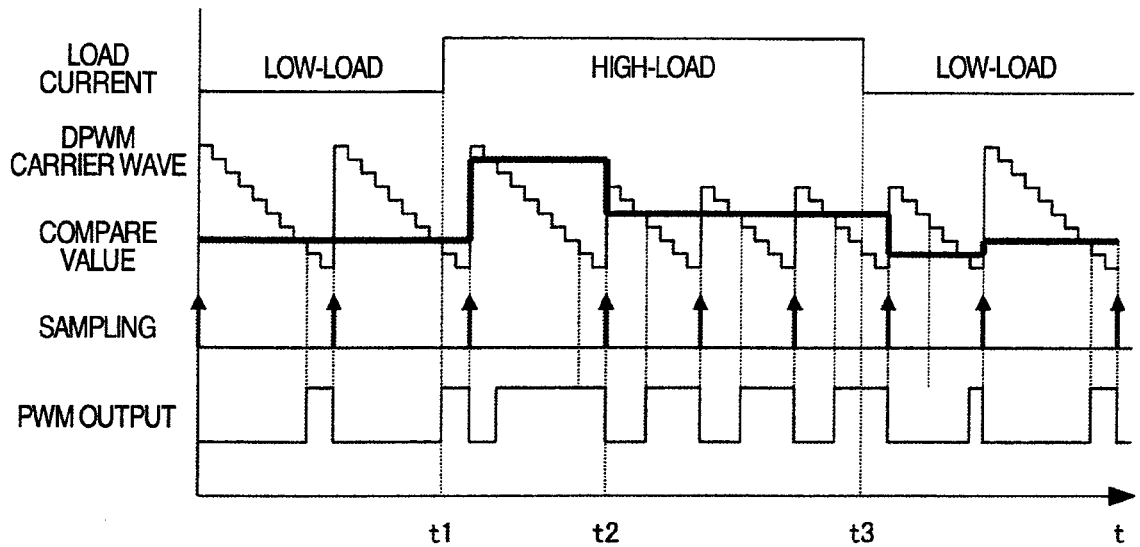
FIG. 6 is a graph to explain an operation of the second embodiment.

Next, description will be given of operation of the embodiment by referring to FIG. 6. Assume as in the first embodiment that the load current Io changes from a low-load state to a high-load state at t1 and from a high-load state to a low-load state at t3. The second embodiment remarkably differs from the first embodiment in that the compare value changes beginning at the sampling period immediately after t1 to considerably elongate the ON period of the PWM output and that the compare value similarly changes beginning at the sampling period immediately after t3 to considerably shorten the ON period of the PWM output. It is hence recognized that as compared with the first embodiment, the second embodiment immediately makes a response to an abrupt change in the load. In the operation, through the voltage and current sampling immediately after the load change at t1 or t3, the judge section 500 determines that the maximum duty value or the Min. duty value is adopted as the compare value. That is, without using the output from the arithmetic processing section having great processing overhead, there is obtained a high-speed response to the load change.

During the period of time in which the maximum duty value is selected as the compare value, the switching frequency is substantially equal to that in the low-load state. That is, the frequency is not variably controlled during this period. Therefore, the inductance of the choke coil is in a reduced state due to the DC bias characteristic and enhances the speedup of the response. After t2, the carrier and sampling frequencies are heightened as in the first embodiment. The object and the advantage thereof can be described in almost the same way as for the first embodiment.

Due to the control in which much importance is attached to the high-speed response in the transient state immediately after occurrence of the load change as well as the control in which much importance is attached to the performance by keeping the ripple current fixed in an ordinary state in which the output variation is adjusted within a predetermined range, there can be implemented a small-sized, low-cost power supply capable of responding to a load change at a high speed.

Third Embodiment

Figure 7:
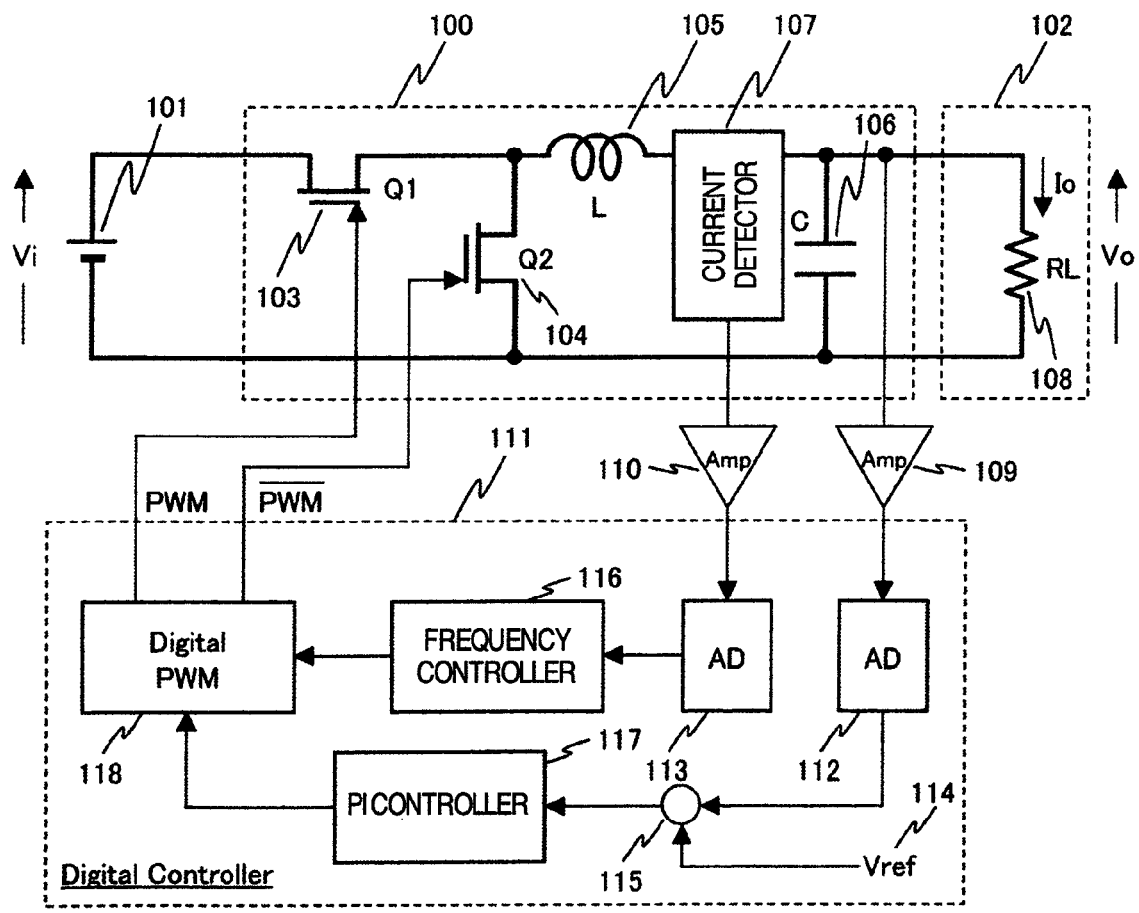
FIG. 7 is a block diagram showing a third embodiment of a digital controlled power supply.

FIG. 7 shows a third embodiment of the present invention. The same constituent components as those of the embodiments above will not be described.

The third embodiment has an aspect in which the sampling frequency is fixed and the frequency controller 116 variably controls only the clock frequency. That is, the frequency controller 116 variably controls the clock frequencies of the digital PWM circuit 118 and the PI control module 117 to optimal values on the basis of the output resultant from the current-conversion AD converter 113.

Figure 8:
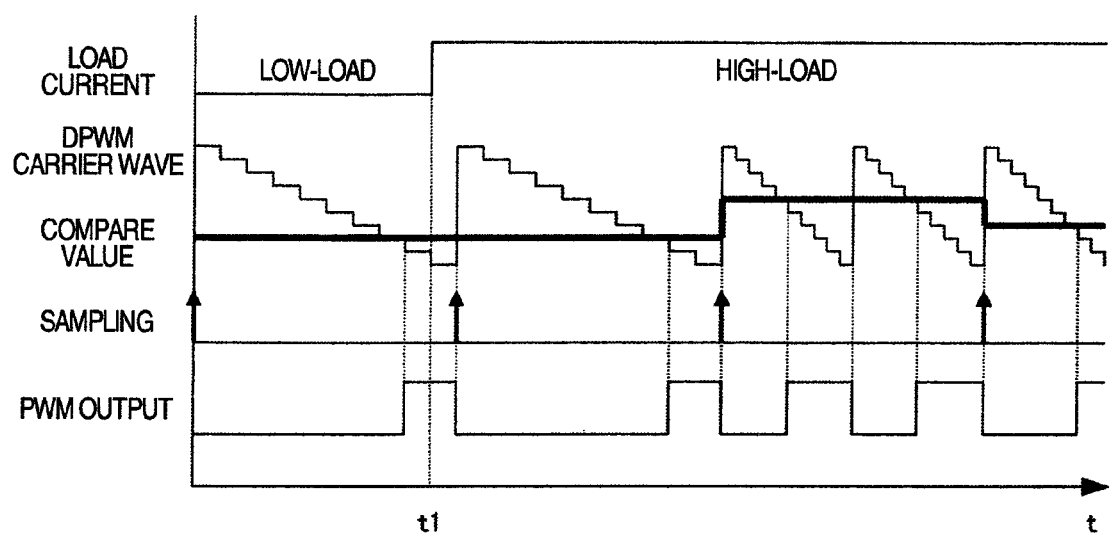
FIG. 8 is a graph to explain an operation of the third embodiment.

Referring to FIG. 8, description will be given of operation of the present embodiment. Assume that the load changes from a low-load state to a high-load state at t1. In the sampling, the voltage and the current of the ripple filter circuit are continuously acquired at a fixed period. When the load changes to a low-load state at t1, an arithmetic operation is conducted during the sampling interval after t1 for an error quantity corresponding to the change in the load. Hence, the compare value changes at each sampling start point after t1.

In the sampling immediately after t1, current information at high-load state is obtained from the current-conversion AD converter 113. On the basis of the information, the frequency controller 116 determines to increase the clock frequency. Hence, like the change in the compare value, the switching frequency is increased. In the first embodiment, the switching frequency is varied by use of a bit count instruction of the counter in the PWM circuit 118. In the third embodiment, the clock frequency is doubled at timing one sample after the load change. In this way, by increasing the switching frequency, the system suppresses an event in which the inductance of the choke coil is lowered and the output ripple current is increased in the high-load state, to resultantly fix the ripple current. Therefore, according to the third embodiment, there are also attained the contents of control operation and an advantage similar to those described in conjunction with the first embodiment.

In the embodiments described above, the output current is obtained by the current-conversion AD converter 113 to variably control the frequencies on the basis of the information of the output current. However, it is also possible that the output resultant from the current-conversion AD converter 113 is supplied also to the PI control module 117 to conduct an operation using the internal reference signal and an error quantity of the output from the current-conversion AD converter 113.

In the above embodiments, the digital control is applied to the power source circuit of the voltage-drop converter, but it is also possible that the control technique is similarly applicable to various other converters.

According to the embodiments, it is possible to provide a small-sized, low-cost digital controlled power supply capable of reliably supplying a stable direct current to a load.

The present invention is applicable to, for example, a digital controlled power supply for an electronic apparatus including a microprocessor.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A digital controlled power supply comprising:
a digital controller for generating a PWM signal, the PWM signal being used to turn on and off a switching element to obtain an output voltage for a load based on an input voltage,
wherein the digital controller comprises:
an AD converter for receiving an analog output current from the power supply and converting the current into a digital value to thereby produce a digital output current value;
arithmetic processing unit for conducting an arithmetic operation of an on-time period or an off-time period of the PWM signal for each period of a sampling frequency of the AD converter or a frequency of a carrier wave as a criterion to obtain the PWM signal; and
a frequency control unit for variably controlling the frequency of the carrier wave based on the digital output current value produced from the AD converter so that a variation of a ripple current based on a DC bias characteristic of a choke coil in a filter circuit of the power supply is controlled to be within a fixed range.

2. The digital controlled power supply according to claim 1, wherein the frequency of carrier wave and the sampling frequency synchronize with each other and respectively have periods substantially equal to each other.

3. The digital controlled power supply according to claim 1, wherein the frequency control unit multiplies the frequency of the carrier wave to produce a plurality of pulses within one sampling frequency.

4. The digital controlled power supply according to claim 1,
wherein the choke coil has a DC bias characteristic in which an inductance value thereof lowers as a load current increases.

5. The digital controlled power supply according to claim 1,
wherein the digital controller comprises:
the AD converter;
a subtracter;
an arithmetic processing section;

and the frequency control unit which are formed in one semiconductor circuit, the subtracter subtracts the output voltage value of the AD converter from a reference value beforehand stored in an internal memory, the arithmetic processing section for generating a compare value by using an output from the subtracter, the compare value being digitally compared with the frequency of carrier wave to obtain a PWM signal, and the frequency control unit variably controls the carrier and sampling frequencies on the basis of the output current value produced from the AD converter.

6. A digital controlled power supply comprising a digital controller for generating a PWM signal, the PWM signal being used to turn on and off a switching element to obtain an output voltage for a load based on an input voltage, wherein the digital controller comprises:

an AD converter for receiving an analog output current and an analog output voltage from the power supply and converting the current and the voltage into digital values to thereby produce a digital output current value and a digital output voltage value;

arithmetic processing means for conducting an arithmetic operation of duty of a pulse width for each period of a sampling frequency of the AD converter or a frequency of a carrier wave as a criterion to obtain the PWM signal on the basis of the digital output current value and the digital output voltage value produced from the AD converter; and frequency control means for variably controlling the frequency of the carrier wave and the sampling frequency on the basis of the digital output current value produced from the AD converter so that a variation of a ripple current based on a DC bias characteristic of a choke coil in a filter circuit of the power supply is controlled to be within a fixed range.

7. The digital controlled power supply according to claim 6, wherein the power supply selectively conducts, on the basis of the digital output current value produced from the AD converter, a changeover for the pulse width between maximum duty, minimum duty, and duty obtained from the arithmetic processing means and sets the duty as a target of the changeover to the pulse width.

8. A digital controlled power supply, comprising:

a digital controller for generating a PWM signal, the signal being used to turn on and off a switching element to obtain from an input voltage an output voltage for a load; and an AD converter for receiving an analog output current from the power supply and converting the current into a digital value to thereby produce a digital output current value, the digital controller comprises arithmetic processing means and frequency control means which are formed in one semiconductor circuit, wherein the arithmetic processing means conducts an arithmetic operation of a pulse width for each period of a sampling frequency of the AD converter or a frequency of a carrier wave as a criterion to obtain the PWM signal, and wherein the frequency control means variably controls the frequency of carrier wave and the sampling frequency on the basis of the digital output current value produced from the AD converter so that a variation of a ripple current based on a DC bias characteristic of a choke coil in a filter circuit of the power supply is controlled to be within a fixed range.

9. A digital controlled power supply according to claim 8, wherein:

the digital controller comprises the AD converter, a subtracter, an arithmetic processing section, and the frequency control means which are formed in one semiconductor circuit;

the subtracter subtracts the output voltage value of the AD converter from a reference value beforehand stored in an internal memory;

the arithmetic processing section for generating a compare value by using an output from the subtracter, the compare value being digitally compared with the frequency of carrier wave to obtain a PWM signal; and the frequency control means variably controls the carrier and sampling frequencies on the basis of the output current value produced from the AD converter.

* * * * *